(No Model.)

T. J. & M. F. INGELS.
POTATO PLANTER.

No. 307,196. Patented Oct. 28, 1884.

Witnesses:
J. R. Littell
F. B. Noyes

Inventors:
T. J. Ingels, M. F. Ingels,
by A. Snow & Co.
Attys.

UNITED STATES PATENT OFFICE.

THOMAS J. INGELS AND MILLARD F. INGELS, OF ATCHISON, KANSAS.

POTATO-PLANTER.

SPECIFICATION forming part of Letters Patent No. 307,196, dated October 28, 1884.

Application filed June 1, 1883. Renewed September 29, 1884. (No model.)

*To all whom it may concern:*

Be it known that we, THOMAS J. INGELS and MILLARD F. INGELS, of Atchison, in the county of Atchison and State of Kansas, have invented certain new and useful Invention in a Potato-Planter; and we do hereby declare that the following is a full, clear, and exact description of the invention, which will enable others skilled in the art to which it appertains to make and use the same, reference being had to the accompanying drawings, which form a part of this specification.

This invention relates to certain new and useful improvements in machines for planting potatoes, and it has for its object to provide means for automatically taking up or picking up the potatoes from the receptacle formed in the body of the machine, then stripping them from the pickers, and finally conducting them into a suitable hopper, whence they descend through a boot or conduit into the furrow; and with these ends in view our invention consists of a suitable body mounted upon wheels and provided with a transverse shaft adapted to receive rotary motion from the main axle when the machine advances, the said transverse shaft being provided with means for oscillating pivoted picker-arms, pivoted striker-arms, which strip the potatoes from the picking-needles, and oscillating conduits or chute-arms, whereby the potatoes are conducted into a suitable hopper at the rear of the machine.

Figure 1:
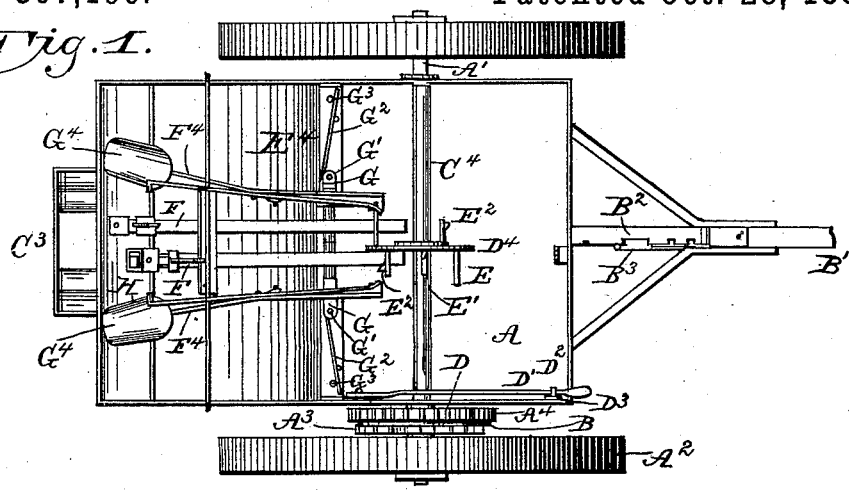
Figure 2:
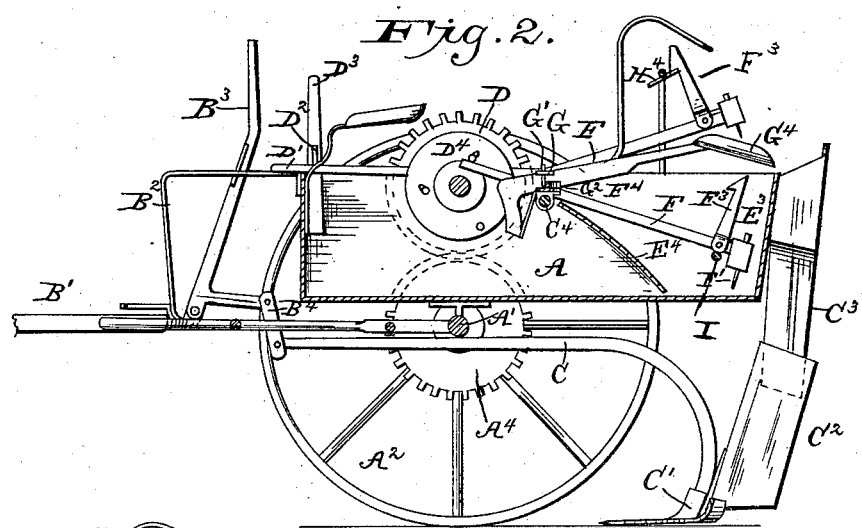
Figure 3:
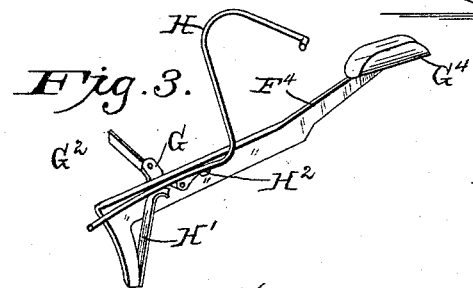
Figure 4:
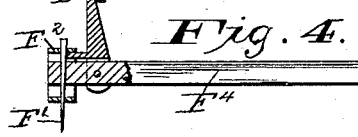

In the accompanying drawings, forming a part of our specification, and on which like letters of reference indicate corresponding parts, Figure 1 represents a plan view of our improved machine; Fig. 2, a longitudinal sectional view of the same; Fig. 3, a detail perspective view of one of the conduit-levers and its attachments and of one of the striker-arms; and Fig. 4, a side elevation of one of the picker-arms, showing the stripper in section.

The letter A indicates the body of our machine, the same being constructed of any suitable material, and preferably of rectangular form. This body is mounted upon an axle, A', adapted to rotate in suitable journals secured thereto, supporting-wheels $A^2$ being rigidly secured—one at each end—to the said axle. Near one end of the axle is secured rigidly a ratchet-wheel, $A^3$, and loosely mounted on the said axle is a gear-wheel, $A^4$, the said wheels being locked together by means of a spring-pawl, B, when the machine is drawn forward. When the machine is backed, this connection is broken by the disengagement of the pawl from the ratchet-wheel. Secured to the axle and to the body is a draft-pole, B', to which and to the forward end of the body is connected a notched locking or segment plate, $B^2$. The letter $B^3$ indicates a bell-crank lever pivoted, preferably, to the pole, to the shorter arm of which, by means of the link $B^4$, is connected the plow-beam C, pivoted to the axle of the machine. To the foot of the said beam is secured a plowshare, C', by which a furrow is formed in the ground. At the rear of the said share and to the beam is attached a tapering boot or chute, $C^2$, adapted to embrace and slide over the lower end of a stationary chute, $C^3$, attached to the rear end of the machine. By means of the lever $B^3$ and the locking-plate $B^2$, with which the lever engages, the depth of the furrow is regulated and the plow held at any desired depth.

The letter $C^4$ indicates a transverse shaft, suitably journaled to the machine and provided at one end with a gear-wheel, D, adapted to be thrown in and out of gear with the gear-wheel $A^4$ by means of the pivoted lever D', which is connected with the said transverse shaft. This lever D' is made to hold the shaft down by means of a lug, $D^2$, extending from the inner side of the standard $D^3$. The shaft $C^4$ is also provided with a disk, $D^4$, from each side of which extend at approximate points the longer actuating-pins E, and from intermediate points shorter actuating-pins E', two of each of which are provided with inclined projections $E^2$ near their outer ends, the other two having like projections near their inner ends, the object of which will hereinafter appear.

The body of the machine is provided with a transverse inclined partition, $E^4$, between which and the end board a receptacle is formed for the reception of the potatoes to be planted. To a transverse rod located near the upper edge of this partition are pivoted a series (two in the present instance) of picker-arms F, the longer portions of which extend into the said receptacle. Through the rear ends of the said arms extend downwardly the picking-needles, points, or tines F'. Around the ends of the picker-arms are loosely fitted stripping-collars $F^2$, the said collars being bored, so as to receive the picking-needles, whereby the strippers are prevented from being dislocated. Pivoted to the said picker-arms, and near their rear ends, are hooked bell-crank detents $F^3$, the shorter arms of which extend under the stripper-collar and act to keep it in an elevated position, by reason of the gravity of the longer arms of the said detents.

The letter $F^4$ refers to pivoted oscillating chute-arms, from one side of which extend lips G, adapted to fit over pins G', which extend from the said transverse rod. From one side of each of said arms extends a spring, $G^2$, which is secured at its other end between the studs $G^3$, also extending from the said rod, the function of these springs being to hold the chute-arms in their normal position, as seen in Fig. 1. The rear ends of the conduit-arms are provided with chute or chutes $G^4$, which serve to conduct the potatoes into the hopper, as will presently appear. The forward ends of these arms are provided with downward extensions, bent or formed so as to extend laterally toward the disk $D^4$ and come within the vertical plane described by the ends of the longer actuating-pins in their rotation about the axis of the transverse shaft. To the inner sides of these arms are pivoted the striker-arms H, the rear ends of which are bent upwardly, and then downwardly, so as to come in contact with the strippers, while the forward ends of the said striker-arms extend within the arc described by the longer actuating-pins, whereby they are engaged by said pins. Springs H' are secured to the downward extension of the chute-arms, their upper ends engaging with the forward extension of the striker-arms, whereby the latter are held in normal position and their rear ends thrust against the strippers, as will presently appear. A stop, $H^2$, is extended from the chute-arms, by which the limit of the movement of the striker-arms is effected. Across the frame of the machine extends a rod, which is provided with a plate, $H^4$, presenting a sharp edge, for the engagement of the hooked ends of the pivoted detents $F^3$, by which the picker-arms are supported in an elevated position until the chutes come in line therewith, as will presently appear. Across the potato-receptacle is another rod, I, the object of which is to form the limit of the downward throw of the picker-arms and to prevent the needles from striking the bottom of the machine.

The operation of our invention will be readily understood, when taken in connection with the above description, and is as follows: When the machine advances, rotation is imparted to the transverse shaft $C^4$, which carries the disk. When one of the shorter pins engages the forward end of one of the picker-arms, the rear end of said arm is elevated and the needle carries with it a potato. When the pin passes beyond the forward end of the said arm, its rear end drops slightly, and the longer arm of the hooked detent catches on the plate secured to the transverse rod, which holds the arm in an elevated position until the longer actuating-pin engages the forward end, which elevates its rear end slightly above the said transverse rod, the end of the said actuating-pin at the same time engaging the forward end of the striker-arm, raising its rear end against the tension of the spring, and also coming in contact with the downward extension of the arm, whereby the said arm is oscillated and the conduit brought in vertical line with the needle, at which instant the forward end of the striker-arm is released, and by the action of the spring is forced quickly against the stripping-collar, whereby the potato is stripped and dropped into the conduit, whence it descends through the shoe into the boot and then into the furrow. After this action has taken place, the rear end of the picker-arm descends by gravity and the needle enters another potato, the chute having been forced out of line with the needle back into the normal position by the action of its spring. When one of the shorter pins comes in contact with the forward end of the picker, its rear end is elevated and the hooked detent made to engage the plate, after which the operation thus described is repeated. The inclined projections on the shorter pins serve to engage the sides of the forward ends of the picker-arms and to make their ends drop in a plane from right to left, so as to make the range of the needle greater from right to left.

Having thus fully described our invention, what we claim as new, and desire to secure by Letters Patent, is—

1. In a machine for planting potatoes, the combination, with the body thereof, a rotating shaft having actuating-pins, and means for operating it, of the picker-arms provided with picking-needles and strippers, the oscillating chute-arms, and the striker-arms adapted to be actuated by the said pins and to conduct the potatoes from the receptacle into the stationary chute, substantially as shown and described.

2. In a machine for planting potatoes, the combination, with the rotating shaft provided with a double series of actuating-pins, of the pivoted picker-arms provided with picking-needles, and pivoted hooked detents adapted to engage a fixed device, whereby the said arms are suspended until engaged by the longer actuating-pins, substantially as shown and described.

3. In a machine for planting potatoes, the combination, with a rotating shaft provided with a disk having actuating-pins, of the pivoted oscillating chute-arms having chutes and springs for holding them in normal position, and the pivoted spring-actuated striker-arms, the said chute and striker-arms being adapted to be actuated by the said pins, substantially as shown and described.

4. In a machine for planting potatoes, the combination, with a picker-arm, of the picking-needles, the stripping-collars, and the pivoted detents, substantially as shown and described.

In testimony that we claim the foregoing as our own we have hereto affixed our signatures in presence of two witnesses.

THOMAS J. INGELS.
MILLARD F. INGELS.

Witnesses:
JAMES W. ORR,
E. G. SIGGERS.